US006732162B1

(12) United States Patent
Wood et al.

(10) Patent No.: US 6,732,162 B1
(45) Date of Patent: May 4, 2004

(54) METHOD OF PROVIDING PREPROCESSED IMAGES FOR A PLURALITY OF INTERNET WEB SITES

(75) Inventors: Lisa T. Wood, Danville, CA (US); Scott M. Lewis, Danville, CA (US); Robin T. Fried, Berkeley, CA (US)

(73) Assignee: Internet Pictures Corporation, San Ramon, CA (US)

( * ) Notice: Subject to any disclaimer, the term of this patent is extended or adjusted under 35 U.S.C. 154(b) by 0 days.

(21) Appl. No.: 09/440,461

(22) Filed: Nov. 15, 1999

(51) Int. Cl.[7] ............................. G06F 15/16; G06F 7/00
(52) U.S. Cl. ....................... 709/219; 709/205; 709/217; 707/2; 707/100; 707/101
(58) Field of Search ................................ 709/217, 219, 709/205–206; 707/201, 200, 170, 103, 204, 205, 1, 2, 104.1, 100, 101; 711/171, 170

(56) References Cited

U.S. PATENT DOCUMENTS

| | | | |
|---|---|---|---|
| 5,001,628 A | * 3/1991 | Johnson et al. ............... 707/10 |
| 5,327,265 A | * 7/1994 | McDonald .................. 358/444 |
| 5,555,388 A | * 9/1996 | Shaughnessy .................. 707/2 |
| 5,678,046 A | * 10/1997 | Cahill et al. .................. 705/30 |
| 5,760,917 A | * 6/1998 | Sheridan .................. 348/211.3 |
| 5,761,404 A | * 6/1998 | Murakami et al. ............. 714/15 |
| 5,781,773 A | 7/1998 | Vanderpool et al. ........ 395/611 |
| 5,799,063 A | * 8/1998 | Krane ..................... 379/88.17 |
| 5,813,009 A | * 9/1998 | Johnson et al. ............. 707/100 |
| 5,845,299 A | 12/1998 | Arora et al. ................. 707/513 |
| 5,890,170 A | 3/1999 | Sidana ........................ 707/501 |
| 6,012,068 A | 1/2000 | Boezeman et al. ......... 707/104 |
| 6,017,157 A | * 1/2000 | Garfinkle et al. ............. 355/40 |
| 6,028,603 A | 2/2000 | Wang et al. ................. 345/350 |
| 6,035,323 A | 3/2000 | Narayen et al. ............ 709/201 |
| 6,202,061 B1 | 3/2001 | Khosla et al. .................. 707/3 |
| 6,301,607 B2 | 10/2001 | Barraclough et al. ....... 709/204 |
| 6,381,029 B1 | 4/2002 | Tipirneni ................... 358/1.14 |
| 6,516,340 B2 | * 2/2003 | Boys ......................... 709/204 |
| 6,539,420 B1 | * 3/2003 | Fields et al. ................ 709/206 |
| 6,542,936 B1 | * 4/2003 | Mayle et al. ................ 709/250 |
| 6,628,417 B1 | * 9/2003 | Naito et al. ................. 358/1.15 |

FOREIGN PATENT DOCUMENTS

EP        0930774 A2 *   7/1999    ............ H04N/1/21

* cited by examiner

*Primary Examiner*—Wen-Tai Lin
(74) *Attorney, Agent, or Firm*—Frost Brown Todd LLC

(57) ABSTRACT

The present invention, generally speaking, provides a broad-based solution for acquisition, processing and distribution of media objects including pictures (images), movies, videos, graphics, sound clips, etc via the Internet or the like. And specifically, it is a solution to such systems for use in applications wherein there are multiple originators of media objects that will be viewed in multiple web sites having different viewing requirements. A browser-based Aprepare and post@ tool prepares and submits media objects from inside a standard browser to a remote server. A Media Acquisition, Processing and Distribution (MAPD) system receives these media objects, processes them to meet specific requirements, and delivers them for integration into remote databases. MAPD system services include media object submission, processing, hosting and mirroring. The hosting service delivers a media object URL to a remote database, allowing the media object to be requested and served by the media object server. The mirroring service delivers the actual media object to multi-point remote databases to be stored and served by the customer.

24 Claims, 8 Drawing Sheets

MIRROR Service Transaction Flow

Host Service Transaction Flow

MIRROR Service Transaction Flow

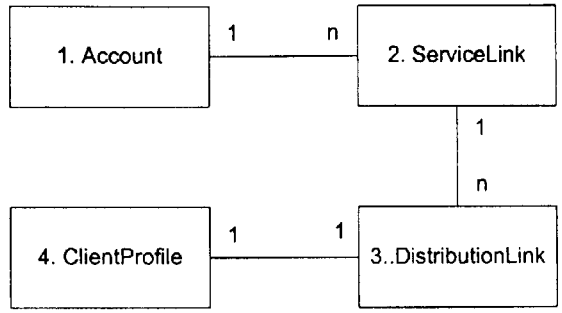

*MIRROR Service Entities*

FIG 12

```
public boolean BindMediaItem(
    int        mediaType,      // jpg image = 1, others not defined
    String     fileName,       // item was saved on disk here
    String     mediaGroupID,   // (e.g., MLS number)
    String     mediaExtID,     // (e.g., zipcode)
    int        seqNum,         // image sequence number in group (1-based)
    int        industryCode,   // NAICS industry code of image submittor
    String     desc1,          // e.g., for real estate could be room name
    String     desc2,          // ""
    String     desc3,          // ""
    ) throws SQLException
{
    // This is where you update the
    // proprietary database with the information
    // passed in above from PictureWorks
}
```

FIG 13

METHOD OF PROVIDING PREPROCESSED IMAGES FOR A PLURALITY OF INTERNET WEB SITES

The present application is related by subject matter to U.S. application Ser. No. 09/357,836 (Atty. Dkt. No. 032374-003) entitled Web-Based Media Submission Tool, filed on Jul. 21, 1999 and incorporated herein by reference.

BACKGROUND OF THE INVENTION

1. Field of the Invention

The present invention relates to the acquisition, processing and distribution of media objects on the Internet and, more particularly, to such systems for use in applications wherein there are multiple originators of media objects that will be viewed in multiple web sites having different viewing requirements.

2. State of the Art

Much of the phenomenal success of the Web is attributable to its graphical nature. Literally, a picture is worth a thousand words. The capture of digital images has become routine, using digital cameras (still and video) and scanners. Nevertheless, although the handling of images by Web site creators has achieved a high degree of automation, for the average user manipulating and sharing digital images over the Internet remains a cumbersome and daunting process. Piecemeal solutions that have been devised for handling digital images require a level of sophistication that is beyond that of the ordinary user. Additionally, where automated solutions do not exist, time consuming and error-prone human and manual intervention are required to manipulate or share images. Such manual intervention for transferring a digital image may include, for example, first downloading a FTP program, then installing it, then running it and connecting it to an FTP server by typing the server name in the connection dialog, then navigating to the proper subdirectory, selecting the files to be uploaded, making sure that the program is in binary transfer mode, then sending the files. For the average user, such an involved process is a disadvantage.

Additionally, as technologies advance and casual users begin to experiment with other image types, such as streaming video, 3D objects, slide shows, movies, and accompanying sound files, the processes required to share these rich media types on the Internet becomes exponentially more complicated and prohibitive. As the realization of the Internet as an interactive, content rich medium becomes more and more a reality, the need for enabling the acquisition and distribution of rich content and media on the Internet will become the gating factor to its long-term success.

Once specific application of handling media over the Internet is in the real-estate market. It has been reported that over 25% of prospective residential home-buyers use the Internet as a means for locating properties of potential interest. There are many web sites dedicated to this purpose, including major real estate portals (e.g., Realtor.com and HomeAdvisor), national and regional brokerages, and individual realtor or broker web sites, to name a few. To be effective, these sites must provide rich visual content in the form of images of the properties listed. The image content can take the form of a single still image, multiple still images, slide shows comprised of a sequence of still images, immersive images (360 degree views), and video tours. These images can also have audio associated with them. The term Amedia object@ is used generically herein to refer to all types of such images, including audio and graphic objects.

While anyone can access the Internet through a browser, getting images posted to the Internet is a complicated process generally requiring a high degree of technical proficiency and specialized software tools. It is even more difficult when the media objects are of multiple types (still images, immersive images, video, etc.) and are created by different originators. For example, a real estate listing might include an image captured by a multiple listing service photographer, an immersive image captured by a professional photographer, and multiple still images taken by the real estate agent herself. Add to this the fact that all of these media objects need to be displayed on multiple web sites that will have different viewing requirements. For example, a national real estate portal may only accept still images of a certain size and quality, say 300×200 pixels at a jpeg compression setting of 60%, while an agent=s individual web site may require a 390×260 pixel representation of the images at a different quality setting. Additionally, different browser versions have different viewing requirements for certain media object types. It is apparent that the problems associated with acquiring media objects from multiple sources and distributing them in the required form to multiple destination web sites are complex.

There are web sites today that offer a subset of this functionality specifically in the on line photo sharing market. These sites allow users to store their personal photographs, display them in a thumbnail or larger view and invite family and friends to view the pictures. These photo sharing sites let users upload digital pictures directly or have film processed and then posted to the web site. The purpose of these sites is to accommodate image uploads from many users within a proprietary system and where the image destination is intended to stay within that system.

The present invention teaches a Media Acquisition, Processing and Distribution (MAPD) system that solves many of the problems of handling media over the internet such as encountered in the real-estate market and photo sharing market. The Media Acquisition, Processing and Distribution (MAPD) system of the present invention has three major components: (1) media acquisition, (2) media processing and (3) media distribution (via hosting or mirroring). The purpose of the MAPD system is to enable multiple users without computer expertise to easily submit media objects that, after appropriate processing in accordance with pre-defined requirements, are viewable on multiple web sites.

The MAPD system of the present invention specifically handles image upload within an open system and that system is designed to process and distribute media objects outside of itself, to be viewed in multiple web sites having different viewing requirements such as desired in the real-estate market. Additionally, the system of the present invention is designed such that the proprietary systems used in the photo sharing sites are unique to each web site and are not designed to be deployed across several web sites, markets or partners. Finally, the MAPD system of the present invention is designed to be used by varying and different web sites across many markets and partners. One important aspect of the MAPD system is its API or abstraction layer that specifically allows multiple web sites to integrate the MAPD system functionality.

SUMMARY OF THE INVENTION

The present invention, generally speaking, provides a broad-based solution for the acquisition, processing and automatic distribution of media objects via the Internet in a manner that does not require a high degree of technical proficiency. Specifically, the present invention provides a media acquisition, processing and distribution system for media objects submitted by multiple users for viewing within a plurality of destination web sites that have different media object viewing requirements. The invention provides means for each of the originators to associate one or more local media objects with a media object interface within a browser. Means are provided for storing information that defines the media object viewing requirements for each of the destination web sites. A remote server or servers receives the media objects from each originator and, based on the information stored in the database, processes the media objects in accordance with the media object viewing requirements of the destination web sites. In a hosting configuration, the remote server(s) send a URL to each destination web site that links the site back to the processed media object for viewing. In a mirroring configuration, the remote server(s) distribute the processed media objects to the destination web site servers.

In accordance with a further aspect of the present invention, within the MAPD client/server architecture, means are provided for intelligently processing the media objects both on the client and server, thereby enabling a more efficient use of bandwidth.

BRIEF DESCRIPTION OF THE DRAWINGS

The invention may be further understood from the following description in conjunction with the appended drawings. In the drawing:

FIG. 12 is a diagram illustrating relationships between mirror service entities; and FIG. 13 is a method called when a new media object arrives at a client site.

DETAILED DESCRIPTION OF THE PREFERRED EMBODIMENTS

The following description describes a system for MAPD that enables the acquisition, processing and distribution of media objects from multiple users to multiple viewing web sites on the Internet. The term Amedia object@ as used herein refers broadly to any form of digital image or graphical file, including still images, PDF files, video images, audio, slide shows, etc. Although in the following description the submission and processing of still images is described in greatest detail, the same principles apply equally to media objects of all descriptions and apply equally to groups of multiple images.

The MAPD system of the present invention is for use in those applications wherein multiple users of the system have a need to submit media objects for viewing on multiple destination web sites that, in general, have different viewing requirements. The term, Aviewing requirements@ refers broadly to the various and unique ways media objects are displayed by web sites. Each web site places different technical requirements and constraints on the way that site uniquely displays media objects and therefore allows for viewing of media objects by visitors to the site. In accordance with the present invention, means are provided in the form of a Aprepare and post@ tool for each of the originators of media objects to associate one or more media objects with a media object identifier on a locally viewable web page, and for uploading the media object or objects to at least one remote server. A database stores information that defines the media object viewing requirements for each of the destination web sites. Within the MAPD client/server architecture, either on the client or server, the MAPD system processes the input media objects to meet the viewing requirements that are specified for each of the destination web sites. Such processing may take the form of image resizing, reformatting (changing the file format), encoding in the case of video, specifying media object storage location and browser version support just to name a few. The MAPD system then either delivers a media object URL to the destination web sites (hosting service) or transfers the processed media objects to the destination web sites ready for viewing (mirroring service). Specifically, the hosting service delivers a media object URL to a web page, allowing the media object to be requested by a customer web site and served by the MAPD system. The mirroring service delivers the actual media object, or other related data such as a media object URL, to a remote database to be served by the host of the destination web site.

Using MAPD system, end users can submit media objects in an immediate and intuitive manner. No technical sophistication is required. In particular, understanding technical terms such as JPEG, resolution, pixel, kilobyte, transfer protocol, IP address, etc., is not required, since the MAPD system automatically and transparently handles all of these tasks for the end user.

Figure 1:
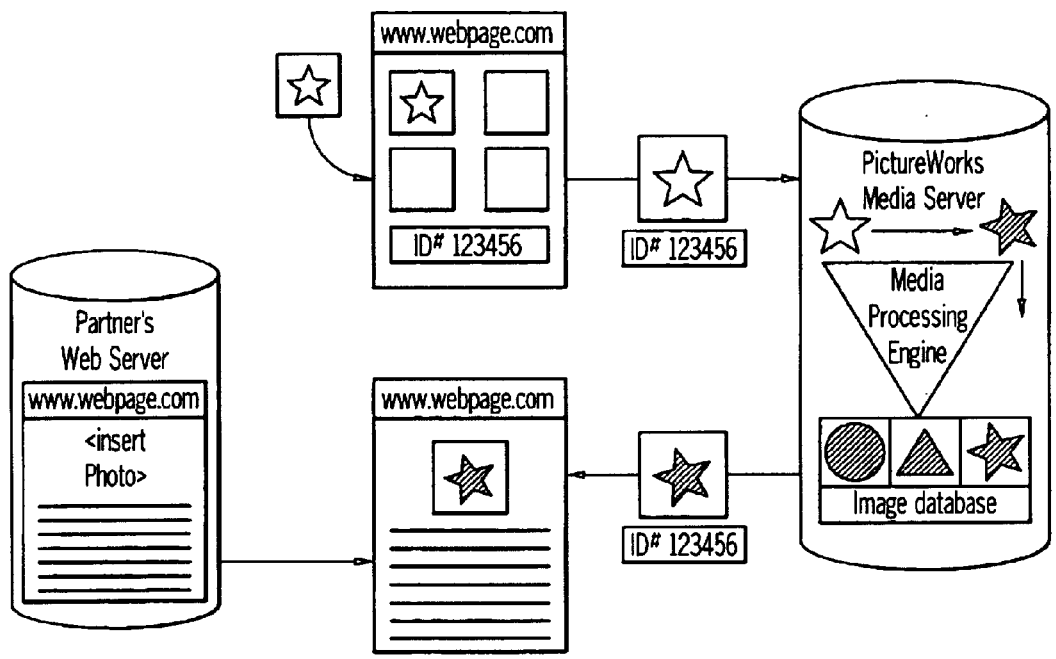
FIG. 1 is a diagram illustrating information flow in accordance with one aspect of the invention.

For on-line commerce customers dealing with high transaction load web sites, hosting is appealing. The MAPD system hosting service allows these customers to incorporate rich media (where rich media can be generally defined as combinations of different media objects such as pictures, movies, sound clips, etc.) into interactive web sites. The MAPD system hosting service provides this rich media to web sites without requiring that they bear the overhead costs associated with hosting the media objects on their own servers or without the technical expertise required to process and create rich media. Referring to FIG. 1, the MAPD system hosting service entails the following step-by-step process:

1. A media object is submitted by an end user (originator) dragging content into a MAPD system customer's web page. Media object ID data is also collected.

2. The media object may be pre-processed, such as converted, reduced, enhanced, etc., on the client within the MAPD client/server architecture.

3. The media object is uploaded into the MAPD system with ID information.

4. The media object is processed by the MAPD system in accordance with a profile that represents the requirements of the destination web sites. The requirement data is stored in a database and the media object is stored on a file server.

5. The MAPD system transparently returns a URL (representing the media object location) to the customer's web page. The media object source URL is embedded in the HTML in the customer's web page and returned to the customer's web server.

6. A hit by an end user (requestor) to the MAPD system customer's web page where the media object source URL is embedded causes the customer's server to request insertion of the media object hosted from the MAPD system.

7. The requested media object is served by the MAPD system and integrated into the customer's web page in real time as the web page draws.

8. The end user's (requestor's) browser presents the finished web page to the end user.

Figure 2:
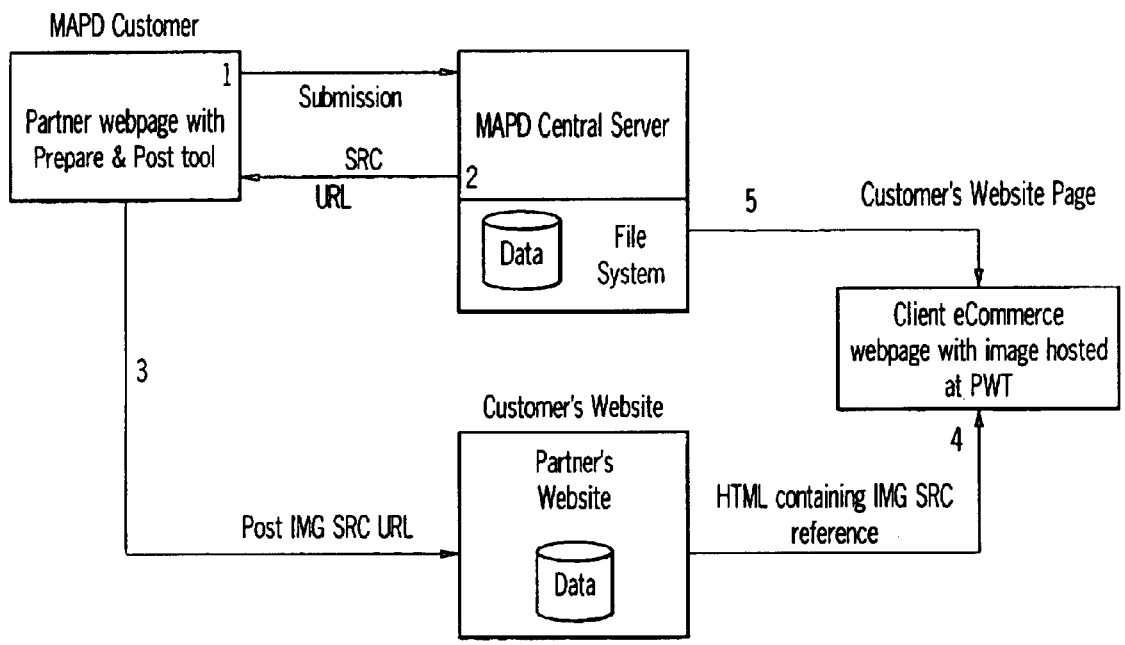
FIG. 2 is a more detailed block diagram corresponding to the diagram of FIG. 1.

Transaction flow for the host service may be further appreciated with reference to FIG. 2. Transaction flow begins with a MAPD system customer=s web page having embedded in it the Aprepare and post@ tool. The Aprepare and post@ tool is represented on the web page as a media object identifier into which the user drags and drops a selected media object. The media object identifier may take the form of a Java applet, an ActiveX control, etc. The function of the identifier is to receive a media object, display a thumbnail or visual representation of the media object, and (optionally) perform preprocessing of the media object. A separate component may be used to upload the media object in response to the user clicking on a Send button. In an exemplary embodiment, clicking on the Send button activates a COM component of the Aprepare and post@ tool, called the Media Sender, for uploading the media object to the MAPD system (step 1).

The MAPD system includes processing capabilities in the form of a "media processing engine" and media object storage including a database and a file system (e.g., file server). When media objects are received, they are "logged" into the database, processed if required, and stored in the file system. As shown in step 2, a media object source URL (IMG SRC URL) is returned to the end user (originator) machine that was used to view the customer's web page. The IMG SRC URL is in turn sent with accompanying form data to the destination web site (step 3).

At the destination web site, a web page is created having HTML that contains the IMG SRC reference. For example, the web page may describe a real estate listing and the media object may be an image of the property being listed. When an end user requests to view the web page (a hit to the web page occurs), HTML containing the IMG SRC URL is delivered to the end user's (requestor=s) computer from the destination web site. The media object itself is delivered separately from the MAPD system but at the same time the destination web page is served (step 5).

Figure 3:
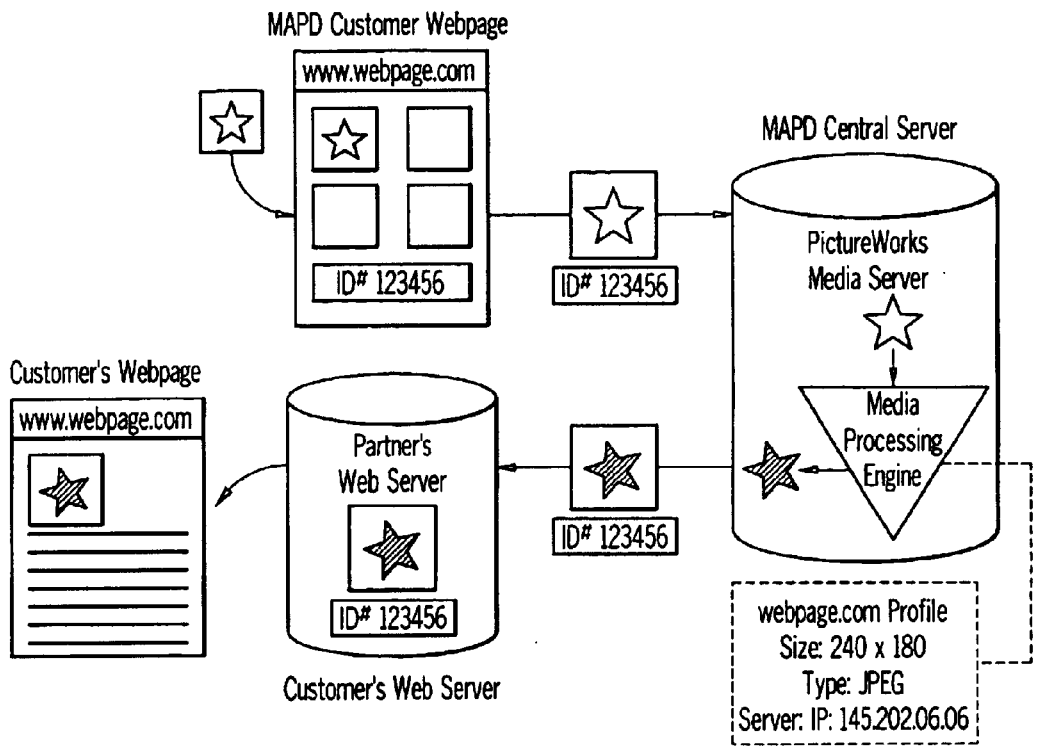
FIG. 3 is a diagram illustrating information flow in accordance with another aspect of the invention.

Some customers may prefer to host media objects on their own servers. In this instance, a MAPD system mirroring service is used. Referring to FIG. 3, the media object mirroring service entails the following steps:

1. A media object is submitted by an end user (originator) dragging content into a MAPD system customer's web page. Media object ID data is also collected.

2. The media object may be pre-processed, such as converted, reduced, enhanced, etc.

3. The media object is uploaded to the MAPD system with ID information.

4. The media object and data are received by the MAPD system and the data is stored in a database while the media object is stored on a file server.

5. A request is placed in the distribution queue notifying the servers that additional processing and preparation may then be required prior to sending.

6. The media object is processed in accordance with a profile that represents the viewing requirements of the destination web sites and the processed media object is distributed to the customer's web server (second location) or to other web servers (e.g., customer affiliate locations) approved by the customer.

7. The media object and ID information are received by the second location and are processed by the customer's servers so that the ID information is automatically stored in a database and the media object is stored in accordance with pre-determined instructions per the second location.

8. When an end user (requestor) hits the customer's web sites that contain media objects from the MAPD system, the web sites and media objects are served from the customer's web server.

Figure 4:
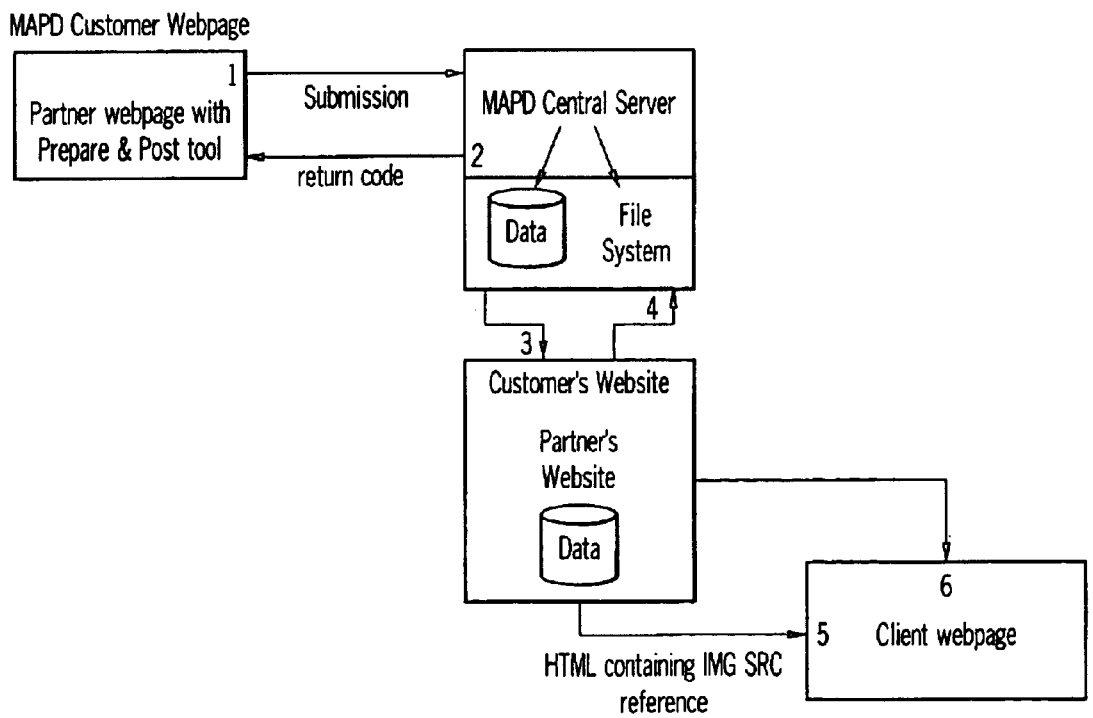
FIG. 4 is a more detailed block diagram corresponding to the diagram of FIG. 3.

Transaction flow for the mirror service may be further appreciated with reference to FIG. 4. As in the case of the hosting service, transaction flow for the mirroring service begins with a MAPD system customer web page having embedded in it the Aprepare and post@ tool, represented as a media object identifier. The end user drops a selected media object into the media object identifier and clicks on the Send button, sending the media object to the MAPD system central server (step 1). A return code is returned (step 2) to the COM component indicating whether or not submission has been successful.

On central servers within MAPD system, the media object is processed in accordance with a stored customer profile. The media object is then sent directly (step 3) to the customer's web site servers, where it is stored. A return code is returned (step 4) to the MAPD system indicating success or failure of media object transfer to the destination web sites.

As in the case of the hosting service, at each destination web site, a web page is created having HTML containing the IMG SRC reference. However in most mirroring scenarios, different from the hosting service, when an end user (requester) hit to the web page occurs, the web page and media object are delivered directly from the customer's servers (steps 5 and 6).

Another implementation of mirroring may not send the media object itself to the MAPD system customer or customer affiliate locations. Other data that references the media object, such as the IMG SRC URL, may be distributed directly to the customer's servers and automatically integrated with web page data. The URL in hosting is returned immediately to the web page where the submission originates. The URL in mirroring is forwarded to another server (second location) not related to the web page where the submission originates. In this instance, the media object will be served from the MAPD system.

Figure 5:
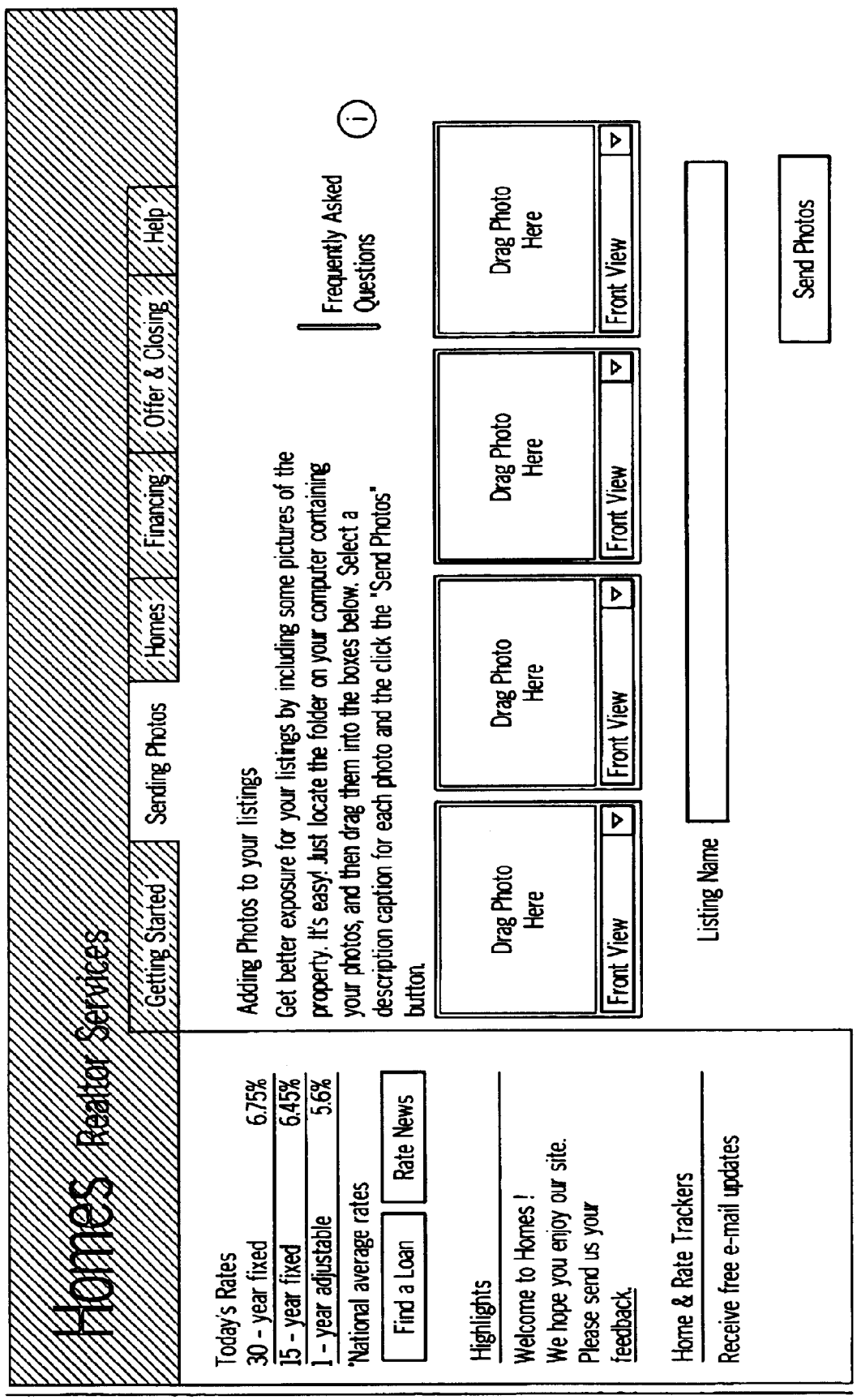
FIG. 5 is a diagram of an exemplary Web page providing image acquisition functions.

Referring to the real estate industry example stated earlier, FIG. 5, is an example of a realty web page featuring the described Aprepare and post@ functionality of the MAPD system. The end user (originator) drags and drops photos into media object identifiers and selects appropriate captions for the media object, e.g., living room, family room, etc. The captions may be typed in or selected from menus. The end user also supplies identifying information, in this instance the multiple listing service number. When the end user clicks the Send Photos button, the media objects are processed and transported immediately according to the configuration of the tool and in accordance with the hosting service or the mirroring service previously described.

There are three ways media objects become associated with a media object identifier. The first is through a "drag and drop" behavior where the user clicks on a media object to select the one they want to submit. The media object is then dragged to the media object identifier. Releasing the mouse button associates the media object with the media object identifier. This behavior is allowed in web browsers that support drag and drop functionality. The Aprepare and post@ tools enable these browsers to accept media objects via drag and drop by providing the media object identifier as an ActiveX component.

The second way to associate a media with the media object identifier is to click on the media object identifier to browse for media objects, then select the media object of choice. This method is made available for web browsers where the media object identifier needs to be a pure Java component. (Such as "signed applet browsers" like Netscape Navigator). In this instance, the user may be asked to choose a media object in a similar manner as when choosing a file to be opened, either by graphical navigation or by specifying a path name. For example, a prompt associated with the media object identifier may be displayed prompting the user to click within the media object identifier. Clicking within the media object identifier brings up a browse dialog. Using the browse dialog, the user selects the desired media object, which is then placed in the media object identifier. The Aprepare and post@ tools will generate a visual representation or thumbnail of the media object, a feature currently not available in signed applet browsers.

A variation of the second way to associate a media object with the media object identifier involves support for older browser versions, also referred to as minimal browsers. Browsers in this category include versions 2.X and 3.X. Also considered part of the minimal browser category are all browsers used on the Macintosh platform. To accommodate complex file sending requirements from within minimal web browsers, the MAPD system implements media object sending through the alternate HTTP channel using the HTML<FILE>element. Once the end user (originator) clicks to send the media object, it is converted to a multi-part mime format for sending to the MAPD system central servers.

The Aprepare and post@ tool also supports a batch interface, allowing a plurality of media objects to be Abatched@ and submitted simultaneously. Most users who are using media objects work with several media objects at the same time versus one media object at a time. Therefore, it is desirable to submit 5, 10 or 25 media objects for processing and distribution at one time for efficiency without having to repeat steps for each of the media objects. An example is a professional photographer who may need to submit several media objects at the same time to several destination web sites. Quickly clicking and dragging a plurality of media objects for submission with the MAPD system is as easy and efficient as submitting one media object.

The description of the present invention thus far has discussed that a media object can be obtained from a single source or from multiple origination sources and that a media object can be transmitted to a single destination and to multiple destinations. The point-to-multi-point distribution is a key advantage of the present invention. This multi-point distribution may be accomplished using distribution lists stored at MAPD system central servers. Distribution lists stored within the MAPD database provide a way for MAPD system customers to specify which of their affiliate web sites get mirrored copies of images submitted through the mirror service distributed directly to them. In technical terms, a distribution list is a named entity that binds a group of destination web sites with a customer via the mirror service. When a media object arrives from a customer on the mirror service, the MAPD system uses the customer's named distribution list to establish which web site servers (i.e., customer affiliate locations) receive copies of the media object. FIG. 12 shows this point-to-multi-point distribution relationship as it is managed by the service link and the distribution list, as will be described herein below.

Each entity in a distribution list has an associated client profile that identifies the remote servers for the destination web sites, the delivery method and any number of processing filters to apply to the media object before sending. Filters are used to control the attributes of media object content delivered to clients, which are tied to the customer profiles. Filters can also be employed to increase functionality within the MAPD system architecture. The attributes may include dimensions, quality and type of media object delivered (i.e., slide show, video) etc. Filters are applied to inbound media objects or outbound media objects or both and are used for both the MAPD system host and mirror service.

More particularly, filters may be associated with both services and clients. Service filters are applied as the media object is received. For mirror services, the service filter is applied as the media object arrives, before it is stored. As the mirror service distributes the media object to clients, the appropriate filter for each client is applied before the media object is sent. For example, a particular mirror service may convert all images to 320×200 jpeg before storing them, and then convert those to the specific requirements of each client on its distribution list prior to transporting the images. For the hosting service, the service filter is applied as the media object is received, and then the appropriate client filter is applied to the result before the media object is stored. Clients and services can share filters. If no filters associated with a given service or client handle a particular file type, then media objects with that file type are not converted for that service or client.

Depending on the particular service, image processing may be performed primarily at the client using the Aprepare and post@ tool, primarily at a MAPD system central server, or may be performed at both, some at the client and some at the MAPD system central server. In the case of the host service, for example, image requirements may be specified within a particular instance of the Aprepare and post@ tool as it is integrated into the web page of a particular customer. Processing the image within the Aprepare and post@ tool avoids unnecessary data transfer. In the case of the mirror service, for example, more than one processed image may be produced from the original image submission. Image processing may therefore be performed primarily at the central server. Nevertheless, basic sizing and resampling may be performed at the client, avoiding the circumstance in which a novice user attempts to upload a huge image file, causing their network connection to "choke."

Although media processing will often involve sizing and formatting of images, any of various kinds of media processing may be performed by the MAPD system media processing engine, for example enhancements and effects, text and graphic layering, image stitching, streaming video encoding, producing zoomable images, cropping, rotating, etc.

For instance, in one embodiment, resizing and format conversion of still images may be performed on either the client or central server. In another embodiment video image encoding may be performed on either the client or central server. In still another embodiment, still images are resized by determining on the central server a maximum still image size for all destination web sites such that the still images are resized no larger than the maximum size on the central server. In this case, resizing of the image may also be performed on the client.

Furthermore, although the MAPD systems have been described as having a central server, any suitable server architecture may be used to support MAPD system services. One type of architecture that is complementary to MAPD system services is a distributed server architecture and global content distribution service offered by Akamai Technologies, Inc. of Cambridge, Mass. under the name Freeflow™. The Freeflow content distribution method allows content providers to ensure rapid access to their sites without needing to maintain burdensome and expensive content distribution infrastructure, using a global network of specialized servers and software that controls how content is distributed throughout the network. Rapid access is achieved by moving bandwidth-intensive content closer to the user. Web site performance is optimized by migrating content according to its popularity while taking into account changing network conditions and fluctuations in traffic. The MAPD system may optionally pass information to this distributed server environment or others, as needed, in order to optimize delivery of the media content the MAPD system creates.

Figure 6:
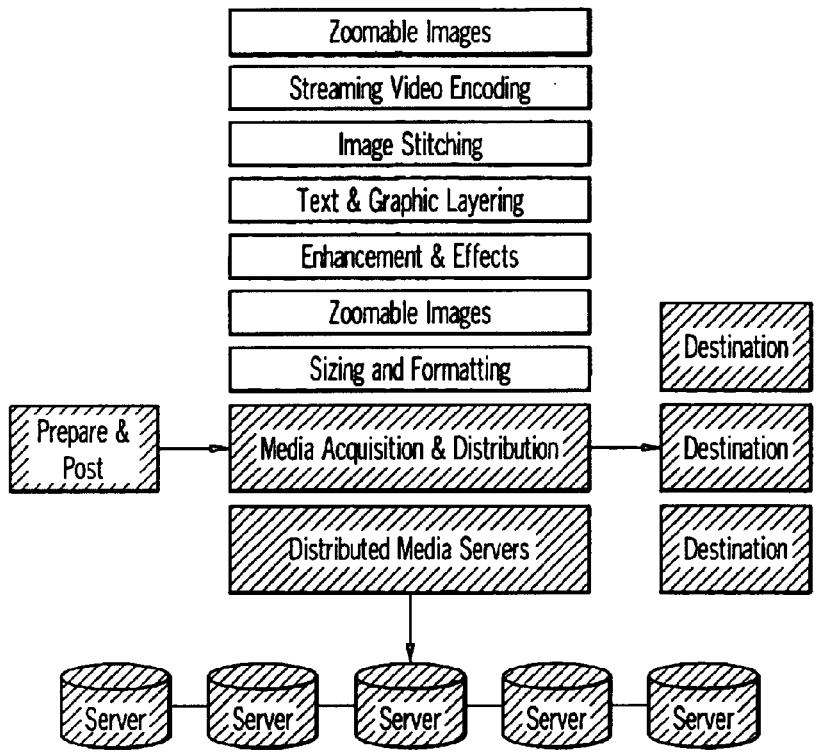
FIG. 6 is a conceptual block diagram of the MAPD system network imaging system work flow and media processing engine scalability.

Referring to FIG. 6 therefore, a block diagram of the MAPD system network imaging architecture is shown. A MAPD system Media Acquisition and Distribution layer (MAPD system central server) provides for media object processing in accordance with customer profiles, and for multi-point distribution as described. Above the MAPD system Media Acquisition and Distribution layer may be various service layers including zoomable images, streaming video encoding, image stitching, slide shows, text and graphic layering, enhancement and effects, sizing and formatting. The architecture is easily extended by added new services as needed. Below the MAPD system Media Acquisition and Distribution layer is the optional distributed server infrastructure, which may be a global hosting infrastructure such as that of Akamai or any other advantageous server infrastructure partner.

Figure 7:
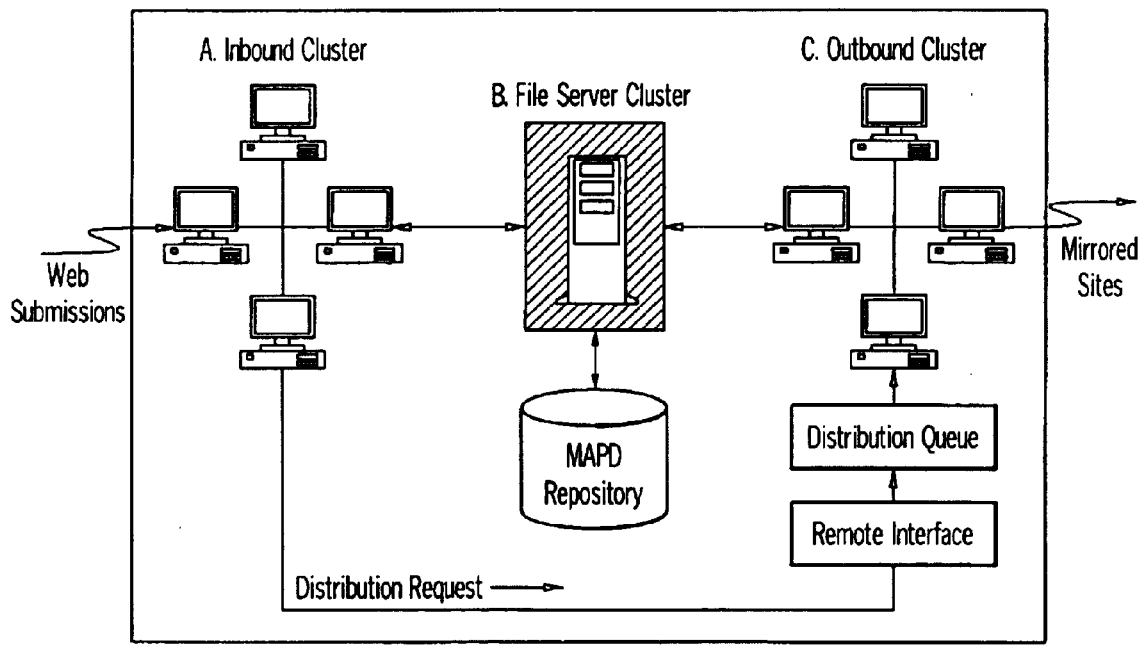
FIG. 7 is a system block diagram of the hardware partition for MAPD system network imaging system mirroring service.

Recognizing that any of various server infrastructures may be used, the MAPD system central hardware architecture in accordance with an exemplary embodiment of the invention will be described. Referring to FIG. 7, an example of how the MAPD system mirroring system hardware could be partitioned is detailed. A cluster organization is followed that uses three clusters, an inbound cluster, a file server cluster and an outbound cluster. The file server cluster is attached to a MAPD system database, or repository. Web submissions from the MAPD system Aprepare and post@ tool are received by the inbound cluster. Within the inbound cluster, the MAPD system repository is consulted in order to form a distribution request, which is sent to a distribution queue at the outbound cluster through a remote interface. Within the outbound cluster, distribution requests are polled and processed by picking up items from the distribution queue and building a distribution list based on the corresponding customer's profile. For each destination in the distribution list, a distribution server within the outbound cluster makes a socket connection to the second location and delivers the media object.

Figure 8:
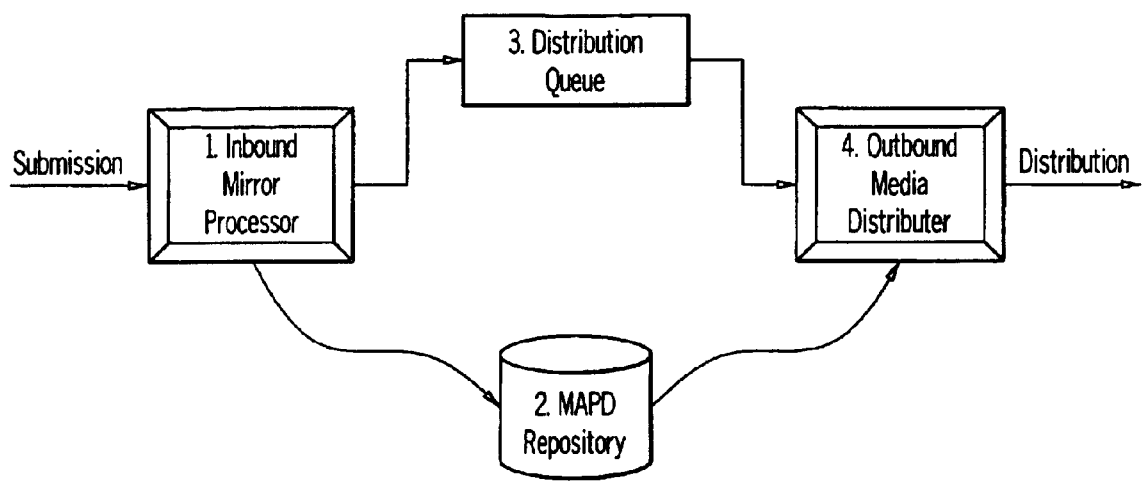
FIG. 8 is a diagram showing the relationship of certain areas of the mirroring service.

Because of the ability to have a media object sent to multiple destinations, the number of outbound transactions is potentially far greater than the number of inbound transactions. To facilitate the transfer of media objects, inbound media processing is separated from outbound media processing. This separation is accomplished by the MAPD system distribution queue. In an exemplary embodiment, the MAPD system distribution queue is a runtime Remote Method Invocation (RMI) object shared between multiple MAPD systems and outbound distribution processors. Referring more particularly to FIG. 8, when a submission arrives for the mirror service, it is received by an inbound mirror processor. The inbound mirror processor stores the submission within the MAPD system repository and adds a distribution object to the distribution queue. The outbound media distributor constantly polls the distribution queue for available items and when one is available, removes it from the queue and carries out the distribution. A single inbound submission to the mirror service typically results in multiple distributions to customer affiliate locations, since the purpose of the mirror service is to allow MAPD system customers to distribute media to that customer's affiliates using a distribution list. Once the outbound media distributor pulls an item off the distribution queue, it is responsible to build a distribution list of all intended recipients and carry out the transfer of media.

A ClientHoldingQueue object may be provided as a holding area for transactions destined for a customer which is unreachable. These transactions are queued as distribution objects until the customer becomes reachable and they can be sent. A ClientHoldingQueue contains a queue of distribution objects similar to the primary queue. It has its own thread to process that queue and it contains the ability to ping its customer as a way of knowing when the customer comes back on line. ClientHoldingQueues are created whenever a normal transmission fails and they go out of existence as soon as they are able to deliver all of their queued objects.

Figure 9:
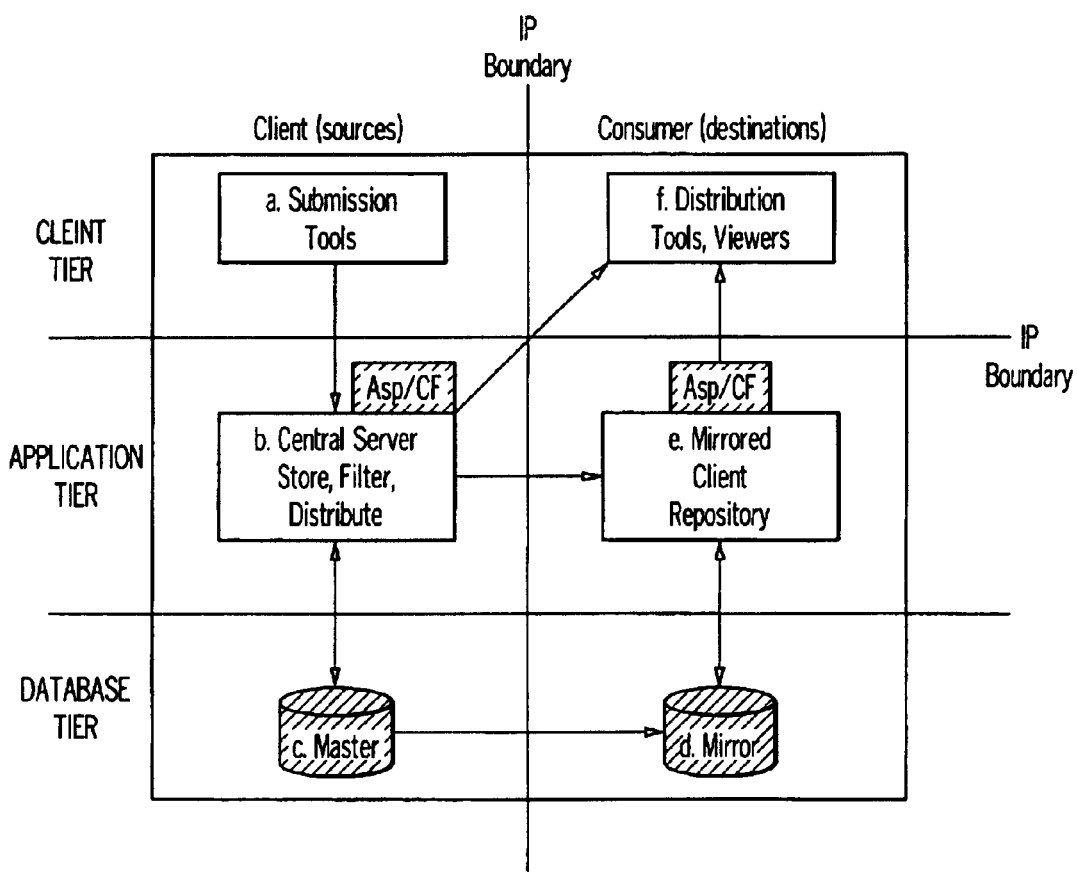
FIG. 9 is a diagram illustrating three-tier partitioning of the network imaging system.

The MAPD system may be realized in two tiers (traditional client/server), three tiers, or, more generally, N tiers. A three-tier implementation in accordance with an exemplary embodiment of the invention is illustrated in FIG. 9. The three-tier partitioning includes a client tier, an application tier and a database tier. Beside tier boundaries, also identified are IP (internet protocol) boundaries. Communication across IP boundaries occurs, for example, through the Internet using the Internet Protocol (IP). A vertical IP boundary separates client (sources) from consumers (destinations). A horizontal IP boundary separates (browser-based) client from servers.

In operation, submission tools (Aprepare and post@) are used to submit media to a central server where the media objects are processed as necessary, stored, and distributed, either by hosting or mirroring. In the case of mirroring, the outbound servers send the media object to a mirrored client repository, causing the media object to be stored within a mirrored database. The media object is accessed from the mirrored client repository using distribution tools and viewers, in particular web browsers. Such access may be accomplished, for example, through Active Server Pages (ASP) or Cold Fusion (CF) for server-side page generation. In the case of hosting, the media object is accessed directly from the MAPD system central servers, using the same or similar techniques, for example.

Figure 10:
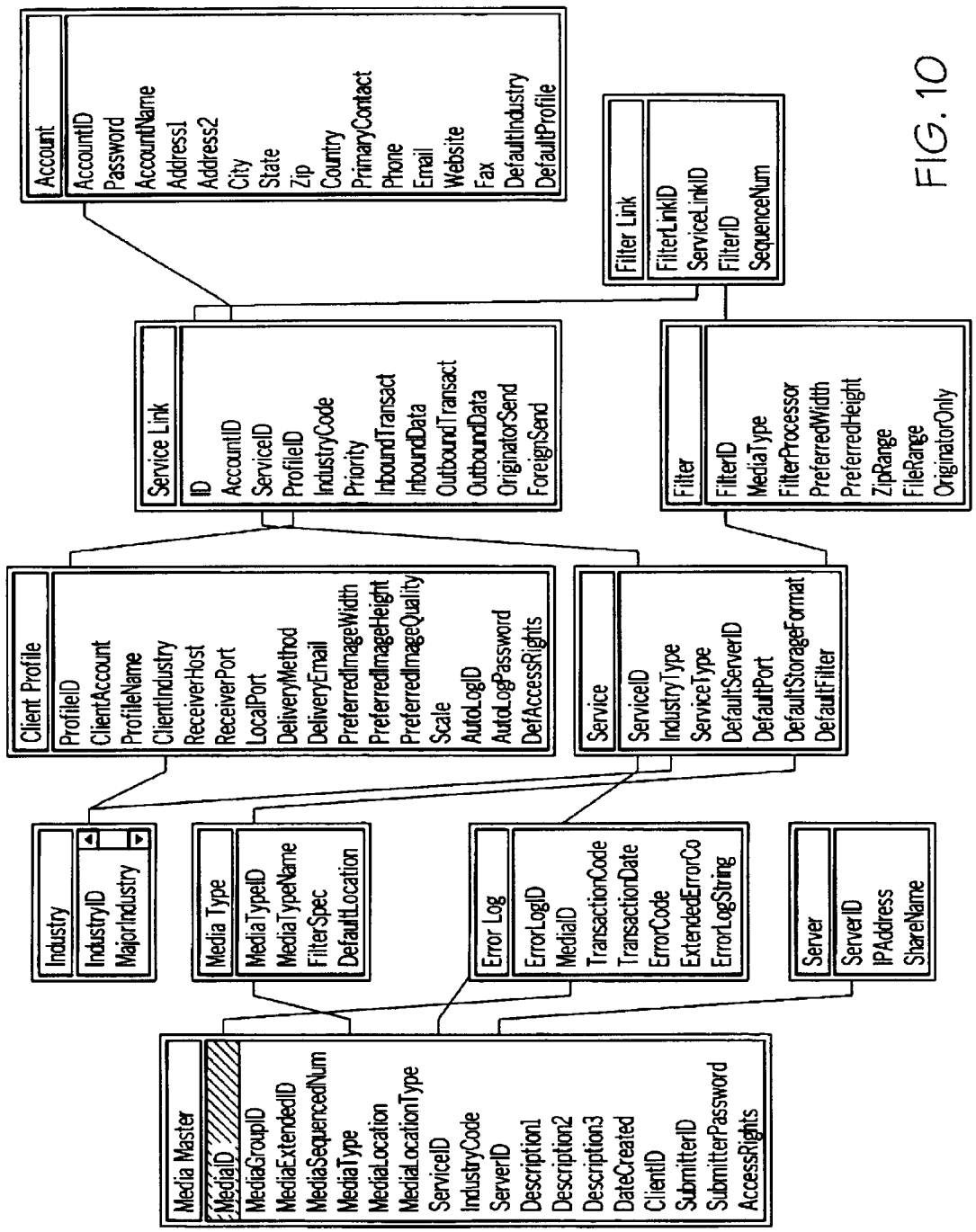
FIG. 10 is an entity/relationship diagram of the database of FIG. 9.

Referring to FIG. 10, the principal MAPD system database system entities (tables) and their relationships are shown in accordance with an exemplary embodiment. Appendix A details the associated database tables. The Account table contains primary account information for each MAPD system service customer. There is only one account record for each MAPD system customer. The ClientProfile table contains profile information used to control customer access to MAPD system services. A MAPD system customer will typically have a single client profile, but may in some instances have more than one customer profile, e.g., if a customer has multiple business units, one or more of which subscribes to MAPD system services. The user table defines users with access rights to account information for a given customer.

The Distribution Link table is used to identify a distribution list associated with the mirror service via a ServiceLink record. The ServiceLink.Distribution-Listname and the ServiceLink.ServiceLinkID are used to identify all the DistributionLink records that are targeted for a media distribution to a second location. Each DistributionLink record identifies a profile (DistributionLink.ProfileID) which identifies the second location for the distribution as well as media distribution characteristics (e.g., filter, applications, etc.).

The Server table identifies various MAPD systems used to process inbound traffic, outbound traffic and media storage. The ErrorLog table records errors in inbound and outbound traffic processing.

The StorageVolume table contains descriptions of MAPD system central server volumes used for media storage. A given service uses a StorageVolume record to identify the server and volume where media will be stored. The physical and virtual paths used to identify the folder location for media items are identified via a StorageLink record in the StorageLink table. The StorageLink table contains physical and virtual folder locations within a given StorageVolume. It is used for identifying the storage location of media items within the MAPD system central server.

The MediaMaster table contains one entry for each unique media element stored in the MAPD system repository. The MediaType table identifies classes of media associated with MAPD system services. The Industry table describes industries associated with MAPD system customers. It may be based on the NAICS industry codes standard.

The Service table describes all available MAPD system services. The ServiceLink table contains associative records which identify customer-specific service characteristics or properties associated with a given service. The Filter table contains filter records. Each filter record defines activities or constraints applied to media. The FilterLink table contains associative records which identify filters associated with a given customer.

Further details concerning MAPD system filters and their implementation is found in Appendix B.

Figure 11:
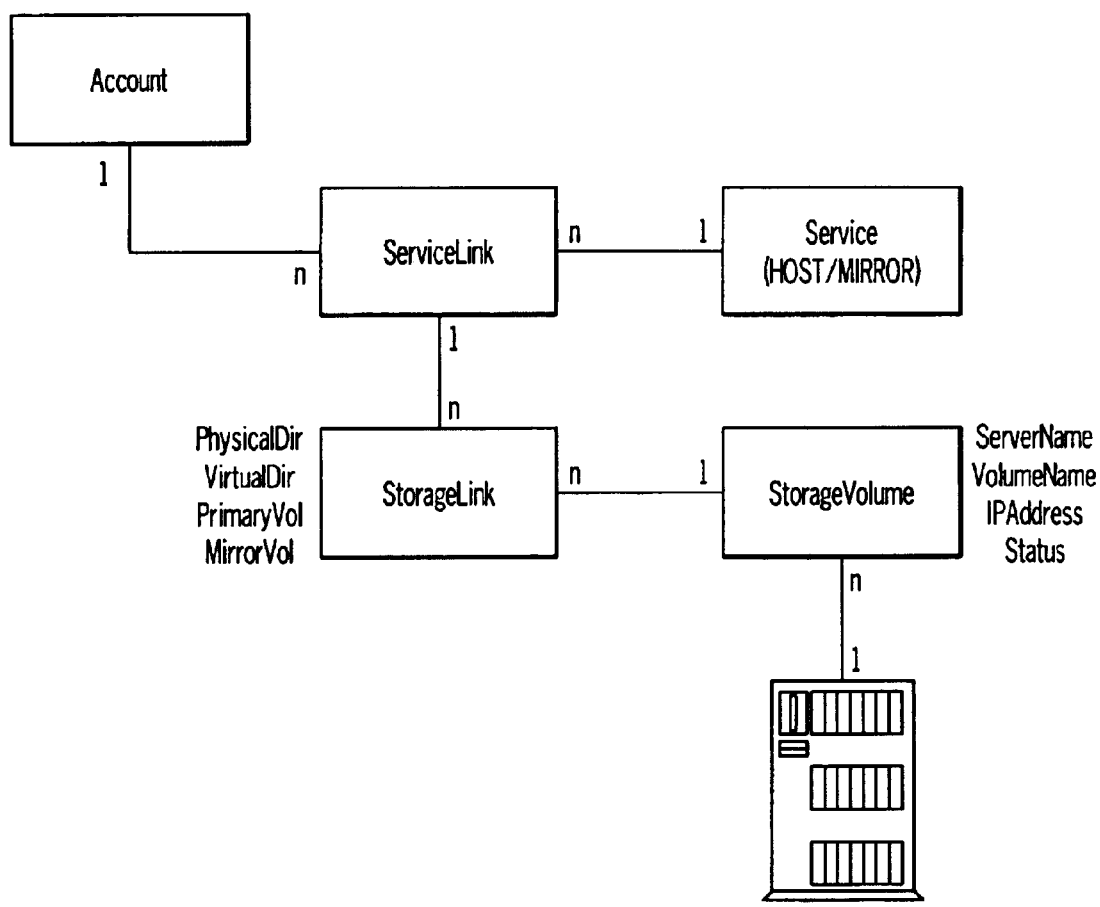
FIG. 11 is a diagram illustrating relationships between account, service and storage entities.

As illustrated in FIG. 11, in general terms, ServiceLinks link an Account to one or more services and ultimately, through StorageLink and StorageVolume entities, to a physical media storage location.

In the case of the mirror service, DistributionLink and ClientProfile entities control the distribution process as illustrated in FIG. 12. When a submission arrives for the mirror service, it is stored within the MAPD system central repository and mirrored to a customer (second location) or customer affiliate locations. The second location and the affiliate locations use MAPD system software, particularly a MAPD system ClientReceiver, to process and store media objects and data. When the media object submission arrives the userID and password are used to lookup the associated Account (1) record. Once the account has been identified, the AccountId and service name (in this instance "MIRROR") are used to find the ServiceLink (2) record associated with the account for the mirror service. The ServiceLink record identifies the distribution list to mirror the submission to. Given a ServiceLinkID and a DistributionName, the DistributionLink (3) table is used to identify the target ClientProfile (4) records used to mirror the submission. The ClientProfile (4) record contains the IP address and port of the mirror site (second location).

The MAPD system communicates with clients to send mirrored media objects through TCP/IP sockets. A MAPD system ClientReceiver is a software agent that sits at the customer site and waits (e.g., on a pre-defined port) for connections from the MAPD system. In an exemplary embodiment, the port is stored with the customer profile in the MAPD system repository and fetched by the media distributor to make the customer connection. Other delivery methods may be used instead of sockets, e.g., HTTP filesend, FTP push, e-mail etc.

In order to effectively use the media objects, to match media objects with customer's databases, customers need to be able to automatically integrate incoming media objects (received from MAPD system distribution servers) into their existing database structures. In an exemplary embodiment, a method shown in FIG. 13 is called when a new media object arrives at the customer site (remote destination web site) via the MAPD system ClientReceiver. The ClientReceiver automatically takes the media object that has been sent from MAPD system central and stores it to disk (i.e., line "String filename," in FIG. 13). The storage location is specified in a properties file at the customer's receiving site. The ClientReceiver also passes the information about the media object (unique ID number, sequence number, description fields, etc.) to a function which can be modified at the customer's receiving location as well (i.e., lines "String mediaGroupID", "String media ExtID", "int seqNum", "int industry Code", "String desc1", "String desc2", and "String desc3", in FIG. 13). The MAPD system provides a function that can be modified to provide the customer's own database with the information the MAPD system passed to the function. Once the new media object has been integrated into the customer's database, it can be immediately used in server-side page generation as a page is requested by a web site visitor.

The function typically stores the media object information in a proprietary database (the MAPD system customer's database). The body of the function is commented out so the customer or the customer's affiliate locations can fill it out with specific instructions (source code to the Java class that contains this function is provided by the MAPD system). The function parameters reflect what was provided during the media object submission using the image submission tool.

MAPD system customers who subscribe to the "mirror" service specify their own servers or affiliate server locations who are approved to receive mirrored copies of the media objects or information about the media objects, such as IMG SRC URL, from the MAPD system. To specify which affiliates receive mirrored information, a distribution list is set up and a small profile is entered for each affiliate in the database. The initial steps for setting up a customer for the mirror service are:

1. A registration form is completed that contains standard entries such as an ID, password, full name, address, phone, e-mail, fax, etc. MAPD system central server uses this information to establish a service record(s) for the customer account.

2. Distribution list forms are completed for each approved affiliate or customer server and appropriate information such as IP address to send images to, transformations to be performed on media objects etc. MAPD system central server uses this information to establish a profile for each affiliate.

The profile contains the preferred delivery method (ClientReceiver, e-mail or FTP for the mirror service.) For delivery by the ClientReceiver, the entry contains the IP address and Port for the ClientReceiver.

The MAPD system ClientReceiver is provided to the customer and, in an exemplary embodiment, is a Java application or process that runs on any platform supporting the generic JDK 1.1 or later versions. The ClientReceiver sits on one of the customer's remote web servers or one or more customer's affiliate locations per the customer's designation. When media objects are received by MAPD systems from the Aprepare and post@ media submission tools, they are processed according to the customer's specifications as described earlier and forwarded to any approved affiliate locations by making a socket connection to ClientReceivers installed on the customer's behalf.

In the case where the affiliate locations intended for mirrored delivery cannot install the ClientReceiver or they prefer delivery by a different method, the media object submissions can alternatively be forwarded via other methods such as FTP or by e-mail. The MAPD system is set up to specify delivery instructions by any number of methods including but not limited to ClientReceiver, FTP or e-mail on an affiliate-by-affiliate basis. For example, if Customer #1 wants media objects to be sent to 3 affiliates in a distribution list called "PrimaryAffiliates" (and there can be more than one distribution list), tables at MAPD system central may be set up for delivery by ClientReceiver to the first affiliate, FTP to the second and e-mail to the third. The MAPD system can be configured to have unique and varied distribution lists per the customer's instructions.

The following Appendices C and D describe in greater detail the program architecture for the Image Container (media object identifier) and COM (media sender) components used in an exemplary embodiment of the invention. Appendix E is a general description of the ClientReceiver class used in an exemplary embodiment of the invention.

APPENDIX A

Account Table
Description:
This table contains accounting information for each MAPD service partner. There is only one account record for each MAPD partner.

| Field Name | Data Type | Length | Description |
| --- | --- | --- | --- |
| AccountID | varchar2 | 20 | Unique Account ID |
| AccountName | varchar2 | 50 | Textual name of account |
| Password | varchar2 | 10 | Used for log in |
| Address1 | varchar2 | 80 | |
| Address2 | varchar2 | 80 | |
| City | varchar2 | 50 | |
| State | varchar2 | 25 | |
| Zip | varchar2 | 10 | |
| Country | varchar2 | 20 | |
| PrimaryContract | varchar2 | 50 | |
| Phone | varchar2 | 20 | |
| Email | varchar2 | 50 | |
| Website | varchar2 | 80 | |
| Fax | varchar2 | 20 | |
| Industry | Number | 5 | industry associated with this account |
| UserLifeSpan | Number | 11 | Users of this account live this long by default |

ClientProfile Table
Description:
This table contains profile information used to control client access to MAPD services. A MAPD partner may have more than one client profile (though there is only one typically). This would be the case if a partner has multiple business units, one or more of which subscribes to MAPD services.

| Field Name | Data Type | Length | Description |
| --- | --- | --- | --- |
| ProfileID | Number | 11 | Auto-incremented Unique ID |
| ClientAccount | varchar2 | 20 | AccountName link to Account Table (e.g., Pacific Union) |
| ProfileName | varchar2 | 20 | Textual name for this profile (e.g., PacUnion1) |
| ClientIndustry | Number | 5 | Industry type for this client. Media that come in from this client and are (by default) associated with this industry. |
| ReceiverHost | varchar2 | 80 | Client media receiver URL |
| ReceiverPort | Number | 5 | Port to receive on |
| LocalPort | varchar2 | 5 | Use this port for outbound traffic -- currently not in use (defaults to port 0) |
| DeliveryMethod | varchar2 | 80 | Class file of primary delivery method |
| AltDeliveryMethod | varchar2 | 80 | Class file of alternate delivery method |
| DeliveryEmail | varchar2 | 50 | Email address for DeliveryMethod (email) |
| EmailFormatTemplate | varchar2 | 2048 | Text template for mirroring images via email |
| AutoLogID | varchar2 | 50 | server-to-server connection id |
| AutoLogPassword | varchar2 | 10 | server-to-server connection password |
| DefAccessRights | Number | 4 | default access rights for this profile |

Distribution Link
Description
This table is used to identify a distribution list associated with the MIRROR service via a ServiceLink record. The ServiceLink.DistributionListname and the ServiceLink.ServiceLinkID are used to identify all the DistributionLink records that are targeted for a media distribution. Each DistributionLink record identifies a profile (DistributionLink.ProfIeID) which identifies the target server for the distribution as well as media distribution characteristics (e.g., filter application, etc.)

| Field Name | Data Type | Length | Description |
|---|---|---|---|
| DistributionID | Number | 6 | Auto-incremented Unique ID |
| ServiceLinkID | Number | 4 | Groups distribution items by ServiceLinkID |
| ProfileID | Number | 11 | Identifies the target ClientProfile record |

-continued

Distribution Link
Description
This table is used to identify a distribution list associated with the MIRROR service via a ServiceLink record. The ServiceLink.DistributionListname and the ServiceLink.ServiceLinkID are used to identify all the DistributionLink records that are targeted for a media distribution. Each DistributionLink record identifies a profile (DistributionLink.ProfIeID) which identifies the target server for the distribution as well as media distribution characteristics (e.g., filter application, etc.)

| Field Name | Data Type | Length | Description |
|---|---|---|---|
| DistributionName | varchar2 | 20 | Distribution List name - groups distributions by name for a given account and service (via a ServiceLink record) |

StorageLink
Description:
This table contains descriptions of MAPD Central server volumes used for media storage. A given service uses a StorageLink record to identify the server and volume where media will be stored. The physical and virtual paths used to identify the folder location for media items are also identified.

| Field Name | Data Type | Length | Description |
|---|---|---|---|
| VolumeLinkID | Number | 11 | Auto-incremented primary key |
| ServerName | varchar2 | 30 | Server name (e.g., DELL) |
| VolumeName | varchar2 | 30 | Name of Volume within MAPD (e.g., DriveC -- \\DELL\DriveC) |
| IPAddress | varchar2 | 80 | IP address of server associated with this volume |
| PhysicalDir | varchar2 | 255 | Physical location within volume (e.g., \netpub\wwwroot\mywebserver) |
| VirtualDir | varchar2 | 255 | Virtual directory (e.g., \PWIS\images\hostimages) |
| Status | Number | 2 | Status: 1 = active, 0 = inactive |

MediaMaster Table
Description:
This table contains one entry for each unique media element stored in the MAPD repository.

| Field Name | Data Type | Length | Description |
|---|---|---|---|
| MediaID | Number | 11 | Auto-incremented Unique key |
| MediaGroupID | varchar2 | 150 | Industry-specifc ID (e.g., MLS number) |
| MediaExtendedID | varchar2 | 100 | Media id qualifier such as zipcode |
| MediaSequenceNum | Number | 4 | Identifies media item within a set (e.g., MediaGroupID + ExtendedID + SequenceNum) |
| MediaType | Number | 3 | stored media format (1 = jpg image, 2 = fpx image, 3 = gif, 4 = panorama) |
| OrigName | varchar2 | 80 | Original name of media item at point of submission (i.e., the physical file that was sent - even if a temp file) Does not include path. |
| MediaName | varchar2 | 80 | Name of item stored on MAPD server. Does not include path. |
| MediaLocation | Number | 4 | foreign key to StorageLink. IMPORTANT NOTE: Do not modify the locations inside a StorageLink record, since old media items will point to an invalid location. If new storage locations need to be assigned to a service, then create a new StorageLink record and use that. |
| ServiceID | varchar2 | 20 | Service requested which resulted in this item being created |
| IndustryCode | Number | 5 | Item is associated with this industry (NAICS code) - 0 means unspecified |

-continued

MediaMaster Table
Description:
This table contains one entry for each unique media element stored in the MAPD repository.

| Field Name | Data Type | Length | Description |
| --- | --- | --- | --- |
| Description1 | varchar2 | 255 | arbitrary values (e.g., room name for a real estate image) |
| Description2 | varchar2 | 255 | arbitrary values |
| Description3 | varchar2 | 255 | arbitrary values |
| DateCreated | Date/Time | | date media item created |
| ClientID | varchar2 | 20 | ID of partner who initiated media upload |
| SubmittorID | varchar2 | 50 | ID of person who submitted media item |
| SubmittorPassword | varchar2 | 10 | Password of person who submitted media item |
| AccessRights | Number | 4 | default 1 = Public (anyone subscribing to Mirroring has access), 0 = submittor and affilitates only |
| HasThumb | Number | 1 | 1 if there is a thumbnail associated with this item |
| ImageWidth | Number | 6 | Width of media image |
| ImageHeight | Number | 6 | Height of media image |

Service Table
Description:
This table describes all available MAPD services.

| Field Name | Data Type | Length | Description |
| --- | --- | --- | --- |
| ServiceID | varchar2 | 20 | Unique ID identifying the service |
| ServiceType | Number | 4 | Identifies service type for this industry group |
| DefaultServerID | varchar2 | 20 | default MAPD server ID for this service |
| DefaultPort | varchar2 | 5 | default MAPD port for service |
| DefaultStorageFormat | Number | 5 | default stored format (e.g., FPX) |
| DefaultFilter | Number | 5 | default filter for client delivery |

Filter Table
Description:
This table contains filter records. Each filter record defines actives or constraints applied to media.

| Field Name | Data Type | Length | Description |
| --- | --- | --- | --- |
| FilterID | Number | 5 | Media filter ID |
| FilterClassName | varchar2 | 80 | Java class name of filter. |
| MediaFileType | varchar2 | 20 | Type (file extension) of media to which this filter should be applied. |
| Convert | Number | | 1 if the media is to be converted to another type (file extension.) 0 otherwise. |
| DestinationFileType | varchar2 | 50 | Output type if above is yes. |
| DestinationQuality | Number | 11 | Output quality (currently only applies to jpeg files.) |
| Resize | Number | | 1 if the media is to be resized. 0 otherwise. |
| AllowExpand | Number | | 1 if the media can be increased in size. 0 Otherwise |
| DestinationWidth | Number | | Output width of media. |
| DestinationHeight | Number | | Output height of media. |
| Template | varchar2 | 255 | Fully-qualified path of conversion template (if used) |

-continued

Filter Table
Description:
This table contains filter records. Each filter record defines actives or constraints applied to media.

| Field Name | Data Type | Length | Description |
| --- | --- | --- | --- |
| TemplateClass | varchar2 | 80 | Class which implements positioning logic (obsolete?) |

Industry Table
Description:
This table describes industries associated with MAPD partners. It is based on the NAICS industry codes standard.

| Field Name | Data Type | Length | Description |
| --- | --- | --- | --- |
| IndustryID | Number | | Auto-incremented. Any client may be associated with multiple industries |
| MajorIndustryCode | Number | | Major Industry code-from U.S. Dept of Labor (example 65 = Real Estate) |
| MinorIndustryCode | Number | | Minor code (eg. 653 = Real Estate Agents and Managers) |
| IndustryName | varchar2 | 50 | Name or type of industry (e.g., Auto) |

ServerControl Table
Description:
This table identifies the various MAPD servers used to process Inbound traffic, Outbound traffic and media storage.

| Field Name | Data Type | Length | Description |
| --- | --- | --- | --- |
| ServerControlID | Number | 4 | Unique id |
| ServerType | varchar2 | 16 | type of server |
| IPAddress | varchar2 | 80 | IP address of this server |
| ControlPort | varchar2 | 50 | server port address |
| Status | Number | 2 | status: 1= active, 0 = inactive |

ServiceLink Table

Description:
This table contains associative records which identify client-specific service characteristics or properties associated with a given service.

| Field Name | Data Type | Length | Description |
| --- | --- | --- | --- |
| ID | Number | 4 | Unique ID for this association |
| AccountID | varchar2 | 20 | account id associated with this linklink to ClientProfile table |
| ServiceID | varchar2 | 20 | link to Service Table |
| ProfileID | Number | | link to ClientProfile table - contains the default profile associated with this account |
| IndustryCode | Number | | U.S. Department of Labor Major industry code (NAICS) |
| Priority | Number | 3 | default = 1 (highest). this is used to decide how/when to forward media associated with this service to the linked client |
| OriginatorSend | Yes/No | | default = false, if true, media for this service sent by this originator and its affiliates is distributed only to the originator. Answers the question: Whom do you want to allow to receive this media item? |
| ForeignSend | Yes/No | | Default = true, if false, this client only wants media for this service which originated from this client and its affiliates. Answers the question: Whose media do you want to receive? |
| DistributionList | varchar2 | 2000 | List of semi-column separated named distribution lists. Each item organizes a list of destinations, with each destination being associated with a client profile containing a delivery method, IP addresses, etc. |
| SubmitSelList | varchar2 | 2000 | Image well default selection list for this client's service |
| StorageLinkID | Number | | Link to storage locator record |
| StorageGenerator | varchar2 | 50 | class name of storage constructor class |
| MaxMediaPerUser | Number | 10 | maximum submissions for a single user of this service |
| SecurityClass | varchar2 | 50 | class name of security class. Run on server at submission reception time. |
| MediaLifeSpan | Number | | Lifespan of media received on this service |

FilterLink Table

Description:
This table contains associative records which identify filters associated with a given client.

| Field Name | Data Type | Length | Description |
| --- | --- | --- | --- |
| FilterLinkID | Number | | Auto-incremented Unique ID |
| ServiceLinkID | Number | 4 | Appy filter to media inbound to this service |
| ClientProfileID | Number | | The filter below is associated with this client |
| FilterID | varchar2 | 64 | comma-delimited list of filterids from filter table |

ErrorLog Table

Description:
This table records errors in Inbound and Outbound traffic processing.

| Field Name | Data Type | Length | Description |
| --- | --- | --- | --- |
| ErrorLogID | Number | 11 | Auto-incremented Unique ID |
| TimeOfOccurrence | Date | | Date & Time of occurrence |
| Media | Number | 11 | ID of media item processed |
| Host | varchar2 | 50 | Host ID of inbound/outbound transaction |
| Port | Number | 5 | Port error occurred on |
| ClassName | varchar2 | 50 | Java classname where error occurred |
| FunctionName | varchar2 | 50 | Java function within class |
| Severity | varchar2 | 50 | severity code |
| Reason | varchar2 | 128 | reason for error |
| Response | varchar2 | 128 | action taken in response to error |
| Context | varchar2 | 255 | general description |
| Exception | varchar2 | 255 | java exception |

ServerControl Table

Description:
This table contains the location (IP Address) and execution status MAPD server processes.
It is used to register servers so they may receive external communication commands
(see External Commands for details.)

| Field Name | Data Type | Length | Description |
| --- | --- | --- | --- |
| ServerControlID | AutoNumber | | Unique ID |
| ServerType | Number | | Apply filter to media inbound to this service |
| IPAddress | Number | | The filter below is associated with this client |
| ControlPort | Number | | Link to filter table |
| Status | Number | | 0 = not running, 1 if currently running |

User_r Table

Description:
This table defines users with access rights to account information for a given partner. Note that the names
User_r and Privileges_r are named as such because Oracle reserves the names User and Privileges
within its namespace.

| Field Name | Data Type | Length | Description |
| --- | --- | --- | --- |
| UserID | AutoNumber | | Unique ID |
| FirstName | varchar2 | 20 | e.g., Fred |
| MiddleInit | varchar2 | 3 | |
| LastName | varchar2 | 20 | |
| User_r | varchar2 | 50 | e.g., freds - up to 10 alpha numeric |
| Password | varchar2 | 10 | up to 10 alphanumeric |
| AccountID | varchar2 | 20 | link to account table |
| OfficeID | varchar2 | 20 | |
| Phone | varchar2 | 20 | contact phone number |
| Email | varchar2 | 50 | email address |
| Privileges_r | Number | 5 | Administration access rights |
| SupportLevel | Number | 5 | |
| CreateDate | Date | | date user added to system |
| MaxSubmissionsAllowed | Number | 50 | This user can only have 50 active media items. if −1, then use default from servicelink |
| LastAccessDate | Date | | Last time logged on |
| SendEmailUpdates | Number | 1 | marketing stuff |
| ShareContactInfo | Number | 1 | marketing stuff |

DistributionLink Table

Description:
This table defines members of a distribution list. A distribution list is a named entity
(DistributionName). A list is a collection of DistributionLink all with the same
DistributionName and same.

| Field Name | Data Type | Length | Description |
| --- | --- | --- | --- |
| DistributionID | Number | 6 | Unique ID |
| ServiceLinkID | Number | 4 | Groups distribution items by ServiceLink |
| ProfileID | Number | | Identifies the target client profile |
| DistributionName | varchar2 | 20 | Distrirbution List name - groups distributions by name for a given account and service (via ServiceLink) |

Maintenance Table

Description:
This table is used to schedule database object and media retirement activities.

| Field Name | Data Type | Length | Description |
|---|---|---|---|
| RetireNextRun | Date | | Date/time of next retire run |
| RetireIntervalDays | Number | | Number of days between retire runs |
| RetireLogFileNumber | Number | | Next log file number to write retire log to |
| TempDate | Date | | temporary date/time storage for runs |

Transaction Table

Description:
The 'Transaction' database table contains one entry for each transaction that is in progress or has taken place.

| Field Name | Data Type | Length | Description |
|---|---|---|---|
| TransactionID | Number | | Unique identifier generated by database |
| State | Number | 5 | Current transaction state - UNKNOWN, RECEIVED, QUEUED, HELD, SEND, FAILED |
| MediaID | Number | | Identifier of media item being received or sent |
| Bytes | Number | | Number of bytes received or sent in this transaction |
| ServiceLinkID | Number | 4 | ServiceLink under which this media was received |
| ClientProfileID | Number | | Destination (outgoing transactions only) |
| TimeCreated | Date | | Database time stamp when this transaction was created |
| TimeCompleted | Date | | Database time stamp when this transaction was |

APPENDIX B

Database Considerations for Filters

Each service and each client has a set of 0 or more filters associated with it. Filters are represented as entries in a 'Filter' Table. Filters are associated with services or clients by entries in a 'FilterLink' table. Each FilterLink entry maps one filter to one clientservice and/or one client. Note that clients services and clients can share filters.

Filter table entries specify the name of a filter (a java class, see Extensibility below) and other attributes required by the filter such as output dimensions for an image filter. They also indicate the file type (extension) to which they are to be applied. This is either a specific file extension, or 'ALL.' ALL means the filter is the default for any media with a file type which the filter handles, (see handlesType below).

For example, a filter class called 'soundFilter' handles .wav, and .riff extensions. An entry in the Filter Table defines filter 7 as class soundfilter and as applying to all .wav files. Filter 8 is also a soundFilter and defined to apply to 'ALL' files. Entries in the FilterLink Table associate both filter 8 and 9 with Client X. A wav file is destined for Client X. The system looks at the filter set for Client X, sees filter 8 which is a soundfilter, (handles wav files as well as others), and sees that filter 8 has wav listed as the type to which it is to be applied. Filter 8 will take precedence over filter 9 which is also a soundFilter, but is configured for 'ALL.' A specific type match will always take precedence over 'ALL.' Any riff files bound for Client X will be handled by filter 9.

If no filters associated with a given service or client handle a particular file type, then media with that file type are not converted for that service or client.

Filter Extensibility

Filters are implemented as java classes. All filter classes provide a common interface, which includes the following functions:

Constructor—takes a database filter table entry id as a parameter and initializes an instance of this filter with the attributes specified in that entry.

handlesType—given a file extension this returns true if the filter handles media with that extension convert—this performs the conversion.

Compare—returns a comparison value between two filters. This is used to sort media during distribution for efficiency. By ordering destination clients for a particular outbound media according to the filters associated with those clients, identical sets of filters will be adjacent in the order. This means that the media need only be converted once per set of identical filters.

Filters are loaded dynamically, which means new filters can be developed, shipped, and installed while the system is running.

EXAMPLE

Take the case where client X wants to receive all images as jpg files scaled to 320×240 with a quality of 90. To do this, we create the following filter in the filter table:

FilterClassName=ImageFilter
MediaFileType=ALL
DestinationFileType=jpg
DestinationWidth=320
DestinationHeight=240
DestinationQuality=90

Next, we create an entry in the FilterLink table as follows:

ClientProfileID=client X's Client Profile ID
FilterID=ID of filter created above Note that the ImageFilter is implemented in ImageFilter. class. It handles jpg files among others. In the example above, it will be used to convert all file types that it handles to jpg files with the specified dimensions and quality.

| | | PWTImgCont.ocx -- Activex Image Container Component | |
|---|---|---|---|
| Interface Name | Type | Definition | Signature |
| ScaleImage | function | Scales an image in place or to a temporary file | ScaleImage( \destWidth As Integer, \destHeight As Integer, \destQuality As Integer, '0–100 \generateOutputFilename As Boolean 'create tempfile \) As String |
| DelTempFile | sub | Deletes temporary file created with ScaleImage | DelTempfile( ) |
| fileName | String property | Name of file shown in image well | fileName as String |
| ImageName | String property | String value from image caption box | imageName as String |

APPENDIX D

| | | PWISFileSend.dll - COM component for sending media to server | |
|---|---|---|---|
| Interface Name | Type | Definition | Signature |
| SubmitMediaRequest | sub | Transfers image | SubmitMediaRequest( UserID As String, 'partner UID Password As String, ' partner password ServiceType As String, ' "HOST" or "MIRROR" IndustryCode As Integer, ' e.g, 65=real estate MediaType As Integer, ' 1=image 2=video 3=sound OpCode As Integer, ' 1=Add, 2=Update, 3=Delete IPAddr As String, 'Destination IP address filename As String, 'File to send MediaGroupID As String, 'Used to build unique key MediaExtendedID As String, ' " " MediaSequenceNum As Integer, ' " " Desc1 As String, ' 255 chars Desc2 As String, ' 255 chars Desc3 As String) ' 255 chars |
| retCode | read-only integer property | Return code from SubmitMediaRequest | retCode as Integer |
| Scaled | integer property | Indicates whether image was pre-scaled before being sent | Scaled as Integer |
| ServerRetString | String property | Return value from SubmitMediaRequest. If call made on HOST service, this string contains the IMG SRC url | ServerRetString as String |

```
Usage Example (VB Script)
      tempFileName = DragImage1.ScaleImage(320, 240, 89, 1)   ' scale the image object 'DragImage1'
      result = UplHandler.SubmitMediaRequest(                 ' transmit to mad central
            UserID,
            Password,
            ServiceType,
            0,
            1,
            1,
            ipAddress,
            tempFileName,
            mlsNum.Value,
            zipcode,
            imageCount,
            title,
            desc2,
            desc3)
      DragImage3.DelTempFile                                  'delete the temp file
```

APPENDIX E

| | | Client Receiver | | |
|---|---|---|---|---|
| Name | Type | Description | Location | Constraints |
| ClientMediaReceiver.java | Java class | Client Media Handler. Handles incoming MAD media distributions. Media arrive as a binary stream with an encoded descriptive property set. Invokes an instance of the ClientDBBinder to enable data integration at client site (see below). | Java Source: MADS\ClientReceiver Classfile: MADS/ClientReceiver/ Classes | JDK 1.1 compatible. Runs under any operating environment support that version of the JDK (e.g., NT, Windows 9x, Solaris, Mac, etc.) |
| ClientDBBinder.java | Java class | This is a reference implementation (with source code) of a component which is used to integrate incoming media into the client's database. The choice of a Java Bean or COM component is made by the client at installation time. | Java Source: MADS\ClientReceiver Classfile: MADS/ClientReceiver/ Classes | We cannot integrate directly into the client's database unless we understand it's structure. Since in many cases we won't understand it, it's best to provide a reference implementation instructing how to integrate the media properties into a database table structure. |
| ClientMediaReceiver.props | Client Receiver Properties File | This is a properties file installed at the client receiver site. It defines operating parameters for client media reception such as default storage locations, etc. | MADS/ClientReceiver | This file should be extended by the client to identify appropriate database entries (DSN, drivers, default storage tables, etc.). |
| startclientreceiver.bat | batch file | starts the ClientReceiver service | MADS\ClientReceiver | Specifies the name of the controlling properties file on the command line. |

What is claimed is:

1. A method comprising:

submitting by a user a digital image through a user interface presented on a web page viewed on a client computer, the web page being served by a remote web server;

preprocessing the digital image on the client computer through functionality encoded in the web page, said step of preprocessing comprising at least the step of resizing of the digital image;

uploading the preprocessed digital image through the user interface from the client computer;

storing the digital image on a server, said stored digital image being based on the preprocessed digital image uploaded from the client computer;

receiving a request for the stored digital image, said request originating from one of a plurality of destination web sites, each of the plurality of destination web sites having unique viewing requirements and a web server for the destination web site;

processing the stored digital image in accordance with the viewing requirements for the requesting destination web site to create a processed digital image;

transmitting the processed digital Image to the web server corresponding to the requesting destination web site; and displaying the processed digital image on the requesting destination web site.

2. The method of claim 1, wherein the digital image is a still image.

3. The method of claim 1, wherein the step of preprocessing further comprises reformatting the submitted digital image.

4. The method of claim 1, further comprising the step of associating a URL with the stored digital image.

5. The method of claim 4, wherein the request originates from the URL embedded in a destination web site.

6. The method of claim 4, further comprising the step of returning to the client computer the URL associated with the stored digital image.

7. The method of claim 1, wherein the steps are performed sequentially as listed.

8. The method of claim 1, wherein the step of receiving a request for the stored digital image is performed in conjunction with a mirror service.

9. The method of claim 1, wherein the digital image is a video image.

10. The method of claim 1, wherein the digital image is a PDF file.

11. The method of claim 1, wherein the digital image is an immersive image.

12. The method of claim 1, wherein the digital image comprises a plurality of digital images.

13. A method comprising:

submitting by a user a digital image through a user interface viewed on a client computer, the user interface being served by a remote server;

preprocessing the digital image on the client computer through functionality downloaded from the remote server, said step of preprocessing comprising at least the step of resizing of the digital image;

uploading the preprocessed digital image through the served user interface from the client computer;

storing the digital image on a server, said stored digital image being based on the preprocessed digital image uploaded from the client computer;

receiving a request for the stored digital image, said request originating from one of a plurality of web sites, each of the plurality of web sites having unique image requirements;

processing the stored digital image in accordance with the image requirements for the requesting web site to create a processed digital image; and transmitting the processed digital image to the requesting web site.

14. The method of claim 13, wherein the digital image is a still image.

15. The method of claim 13, wherein the step of preprocessing further comprises reformatting the submitted digital image.

16. The method of claim 13, further comprising the step of associating a URL with the stored digital image.

17. The method of claim 14, wherein the request originates from the URL embedded in a destination web site.

18. The method of claim 14, further comprising the step of returning to the client computer the URL associated with the stored digital image.

19. The method of claim 13, wherein the steps are performed sequentially as listed.

20. The method of claim 13, wherein the step of receiving a request for the stored digital image is performed in conjunction with a mirror service.

21. The method of claim 13, wherein the digital image is a video image.

22. The method of claim 13, wherein the digital image is a PDF file.

23. The method of claim 13, wherein the digital image is an immersive image.

24. The method of claim 13, wherein the digital image comprises a plurality of digital images.

* * * * *